(12) United States Patent
Mirashrafi et al.

(10) Patent No.: US 8,892,904 B2
(45) Date of Patent: Nov. 18, 2014

(54) HARDWARE ENFORCED SECURITY GOVERNING ACCESS TO AN OPERATING SYSTEM

(75) Inventors: Mojtaba Mirashrafi, Portland, OR (US); Gyan Prakash, Beaverton, OR (US); Jiphun C. Satapathy, Portland, OR (US); Saurabh Dadu, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 13/612,991

(22) Filed: Sep. 13, 2012

(65) Prior Publication Data

US 2014/0075550 A1    Mar. 13, 2014

(51) Int. Cl.
   *G06F 12/14*    (2006.01)
   *G06F 21/31*    (2013.01)
   *G06F 3/038*    (2013.01)

(52) U.S. Cl.
   CPC ..................................... *G06F 21/31* (2013.01)
   USPC .................. 713/191; 726/1; 726/4; 713/164; 713/167

(58) Field of Classification Search
   None
   See application file for complete search history.

(56) References Cited

U.S. PATENT DOCUMENTS

| | | |
|---|---|---|
| 2003/0115476 A1 | 6/2003 | McKee |
| 2005/0030151 A1 | 2/2005 | Singh |
| 2006/0271788 A1 | 11/2006 | Chang et al. |
| 2008/0320312 A1 | 12/2008 | Duffus et al. |

FOREIGN PATENT DOCUMENTS

EP    2 372 597 A1    10/2011

OTHER PUBLICATIONS

The CRISIS Wide Area Security Architecture. Belani et al. USENIX Security Symposium(1998).*
TruWallet: Trustworthy and Migratable Wallet-Based Web Authentication. Gajek et al. ACM(2009).*
International Search Report and Written Opinion received for PCT Patent Application No. PCT/US2013/058926, mailed on Dec. 30, 2013, 12 Pages.

* cited by examiner

*Primary Examiner* — Venkat Perungavoor
(74) *Attorney, Agent, or Firm* — Grossman, Tucker, Perreault & Pfleger, PLLC (57) ABSTRACT

The present disclosure is directed to systems and methods related to hardware-enforced access protection. An example device may comprise a login agent module (LAM), an operating system login authentication module (OSLAM) and a secure user authentication module (SUAM). The LAM may be configured to cause a prompt requesting login information to be presented by the device. The LAM may then provide the login information to the OSLAM, which may be configured to authenticate the login information using known user information. If authenticated, the OSLAM may generate and transmit a signed login success message to the SUAM using a private key. The SUAM may be secure/trusted software loaded by device firmware, and may be configured to authenticate the signed login success message. If authenticated, the SUAM may transmit an encrypted authentication message to the OSLAM. If the encrypted authentication message is authenticated, the OSLAM may grant access to the device.

10 Claims, 5 Drawing Sheets

HARDWARE ENFORCED SECURITY GOVERNING ACCESS TO AN OPERATING SYSTEM

TECHNICAL FIELD

The present disclosure relates to device security, and more particularly, to systems configured to enhance software-based protection schemes with hardware-enforced security.

BACKGROUND

The variety of mobile devices emerging in the marketplace continues to expand due to, for example, increasing functionality that makes them applicable to many everyday situations. For example, the ability of mobile "smart" devices to communicate data in addition to simple voice interaction makes these devices useful for handling tasks that traditionally needed to be handled over a wired connection (e.g., a desktop linked to the Internet), in-person, etc. These tasks may be conducted using various applications on the mobile device that are configured to provide functionality such as, for example, personal or professional interactivity (e.g., email, messaging, etc.), financial management and transactions (e.g., banking, electronic purchases, etc.), database functionality such as contact management, entertainment applications, etc.

However, the convenience created by mobile device use comes with some inherent risks. There substantial resale value in the mobile device itself, which may make it attractive to others who may wish to possess it unlawfully. Then there is information stored on the mobile device. This information may include identification information (name, address, phone numbers, social security numbers, etc.), financial account information (e.g., bank accounts, credit card numbers, etc.), login information for personal or business-related networks, etc. This information may be worth much more that than the actual mobile device itself in that it may grant access to others to wrongfully access information, make unauthorized transactions, impersonate the device user, etc.

Existing mobile device security may be provided by the device operating system (OS) or by third-party security applications that execute with OS-level privilege. While effective against average users, more advanced users may circumvent these protections by attacking the device at the OS level. For example, dictionary attacks may be utilized to determine passwords, sensitive information may be retrieved by forcibly accessing the device memory using external interfaces, the mobile device may be reconfigured by installing a new OS, etc. As a result, mobile devices continue to be an attractive target for wrongdoers that know how to prey upon their weaknesses.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure describes systems and methods for hardware-enforced access protection. A device may comprise, for example, a login agent module (LAM), an operating system login authentication module (OSLAM) and a secure user authentication module (SUAM). Initially, the LAM may be configured to cause a prompt to be presented by a user interface in the device. The prompt may request login information to be entered into the device (e.g., by a device user). The LAM may be further configured to provide the login information to the OSLAM, which may be configured to authenticate the login information. If the login information is authenticated, the OSLAM may be further configured to transmit a signed login success message to the SUAM. In one embodiment, the SUAM may be loaded (e.g., by firmware) into a secure memory space in the device such as, for example, a trusted execution environment (TEE). The SUAM may be configured to authenticate the signed login success message, and if authenticated, to transmit an encrypted authentication message to the OSLAM. The OSLAM may be further configured to decrypt and authenticate the encrypted authentication message. If authenticated, the OSLAM may grant access to the device.

In one embodiment, the OSLAM may include a private key and the SUAM may include a public key. The private key may be protected by known user information in the device. When a user logs into the device (e.g., enters login information), the login information may be compared to the known user information, and access may be granted to the private key only when the login information corresponds to the known user information. The private key may then be used to generate the signed login success message, which may be authenticated by the SUAM using the public key. Likewise, the encrypted authentication message may be decrypted by the OSLAM using the private key. In one embodiment, the private key may be encrypted by the TEE root to provide additional protection (e.g., to prevent the private key from being determined as the result of a dictionary attack where key combinations are continually guessed until a match is found).

In one embodiment, the device may further include a firmware interface module. The firmware interface module may be configured to convey the signed login success message from the OSLAM to the SUAM, and conversely, to convey the encrypted authentication message from the SUAM to OSLAM. In the same or a different embodiment the device may further include a secure policy module (SPM) and/or an authentication recovery module (ARM). The SPM may be configured to control the operation of the LAM, OSLAM and/or the SUAM. In the instance of the LAM and OSLAM the SPM may be configured to determine a context for the device (e.g., device location, device condition, etc.) and may set a login policy that controls the operation of the LAM and/or the OSLAM based on the context. For example, SPM may determine that the device is at a "home" location, and may require less login information to be entered as opposed to when the device is determined to be at a known location. The SPM may be further configured to, for example, define a wait timer and/or a maximum number of login attempts in the SUAM. The wait timer may define how long the SUAM will wait for receipt of the signed login success message before the SUAM causes the device to shut down. In one embodiment, if the wait timer expires without the signed login success message being received, the SUAM may then determine whether the maximum number of login attempts has been exceeded. If the maximum number of login attempts has been exceeded, the SUAM may place the device into a lockout state, wherein access may be denied to the operating system until a user authentication recovery is performed. The ARM may be configured to perform user a authentication recovery when the device is connected to a remote resource (e.g., a computing device accessible via a network connection).

In one embodiment, the remote resource may be server accessible via the Internet, the server being configured to provision private keys to devices. For example, when activated the device may be configured to initially determine whether it is connected to the remote resource. The device may then be configured to determine if the private key is present in the device. If the device is not connected to the remote resource and the private key is present in the device, then hardware-enforced access protection may be started in the device. If the device is not connected to the remote resource and the private key is not present in the device, then the device may present a notification (e.g., to the device user) instructing that a security setup must be performed before using the device, the security setup requiring the device to be connected to the remote resource. If the device is connected to the remote resource and the device is a new device (e.g., no private key is present), then security software may be downloaded to the device (e.g., some or all of the LAM and OSLAM) from the remote resource and the private key may be provisioned by the remote resource. If the device is connected to the remote resource and user authentication recovery is required, the remote resource may perform user authentication recovery (e.g., may confirm the user's identity through personal inquiries, passwords, keys etc.). If the user is authenticated by the remote resource, the existing security configuration in the device may be reset and a new private key may be provisioned to the device from the remote resource.

Figure 1:
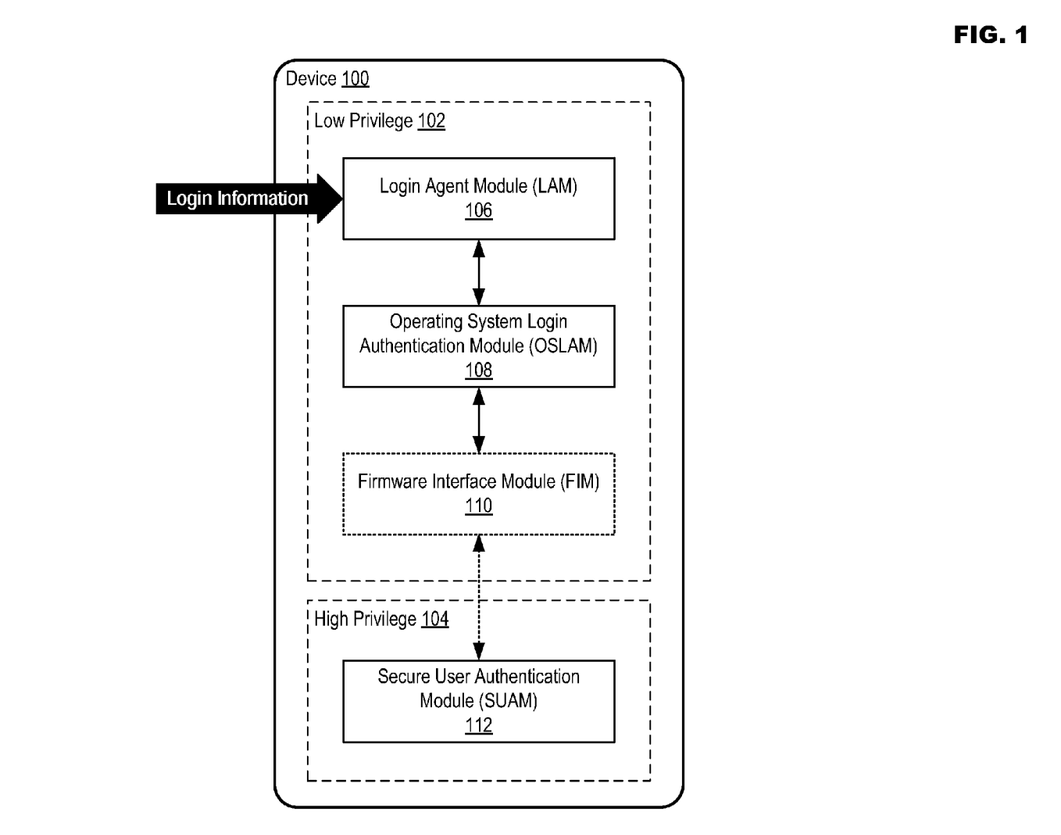
FIG. 1 illustrates an example device configured for hardware-enforced access protection in accordance with at least one embodiment of the present disclosure.

FIG. 1 illustrates example device 100 configured for hardware-enforced access protection in accordance with at least one embodiment of the present disclosure. Examples of device 100 may include, but are not limited to, a mobile communication device such as a cellular handset or a smartphone based on the Android® operating system (OS), iOS®, Blackberry® OS, Palm® OS, Symbian® OS, etc., a mobile computing device such as a tablet computer like an iPad®, Galaxy Tab®, Kindle Fire®, etc., an Ultrabook® including a low-power chipset manufactured by Intel Corp., a netbook, a notebook computer, a laptop computer, a computing device that is typically stationary such as a desktop computer, etc. Device 100 may include, for example, at least two types of execution environment in which various modules in device 100 may operate. Low privilege environment 102 may be, for example, an operating system (OS) in device 100. Modules operating in low privilege environment 102 are not "measured" (e.g., verified based on a hash of their code to determine authenticity) 100, and thus, may be freely written to, executed, changed, etc. High privilege module 104 may be, for example, a trusted execution environment (TEE) in device 100. High privilege environment 104 may provide a cryptographically protected execution environment in which modules may operate that is separate from possible interference or intervention by outside influences. As a result, hardware management, emulation, debugging, security and other system-critical features generally execute in high privilege environment 104.

In one embodiment, low privilege environment 102 in device 100 (e.g., an OS in device 100) may include at least LAM 106 and OSLAM 108. LAM 106 may be configured to obtain login information (e.g., from a user of device 100). For example, LAM 106 may cause a prompt to be presented via a user interface of device 100 (e.g., a display) requesting the entry of login information into device 100 (e.g., via a touch screen, keypad, etc. in device 100). The login information may then be passed to OSLAM 108, which may be configured to authenticate the login information. For example, OSLAM 108 may determine if the login information received from LAM 106 corresponds to known user information in device 100. If the login information is authenticated, OSLAM may generate a signed login success message. For example, the signed login success message may be signed using a private key in OSLAM 108. In one embodiment, low privilege environment 102 may further comprise firmware interface module (FIM) 110. FIM 110 may be configured to facilitate interaction between OSLAM 108 and SUAM 112 in high privilege execution environment 104. For example, the signed login success message may be transmitted from OSLAM 108 to FIM 110, and from FIM 110 to SUAM 112. FIM 110 has been shown as optional in FIG. 1 as its functionality may also be incorporated into OSLAM 108.

SUAM 112 may be loaded into high privilege environment 104. For example, SUAM 112 may be loaded into device 100 upon activation from firmware in device 100. SUAM 112 may also be "measured" in that, during loading, the hash value of the program code of SUAM 112 may be compared to a hash value of a known good version of SUAM 112 by hardware in device 100, and if the hash of the program code matches the known good hash value then the code may be allowed to load. SUAM 112 may be configured to control access to device 100 based on receipt of the signed login success message. For example, if the signed login success message is received, SUAM 112 may then authenticate the message (e.g., using a public key). If the signed login success message is authenticated, the SUAM 112 may transmit an encrypted authentication message to OSLAM 108 (e.g., via FIM 110), which may cause OSLAM 108 to unlock device 100 (e.g., to grant access to device 100). Otherwise, if the signed login success message is not received, or if a received signed login success message cannot be authenticated, then SUAM 112 may cause the device to shut down. In some instances, SUAM 112 may also cause the device to enter a lockout state requiring user authentication recovery.

Figure 2:
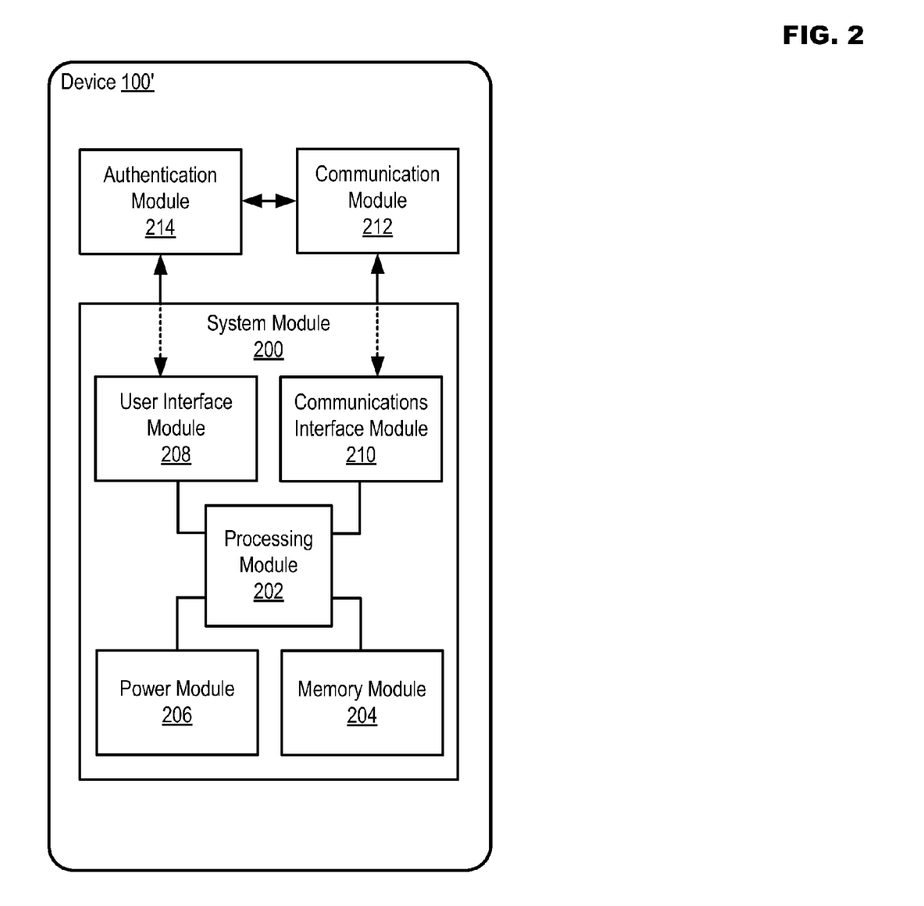
FIG. 2 illustrates an example device configuration in accordance with at least one embodiment of the present disclosure.

FIG. 2 illustrates an example configuration for device 100' in accordance with at least one embodiment of the present disclosure. Device 100' may comprise, for example, system module 200, which may be configured to manage normal operations in device 100'. System module 200 may comprise, for example, processing module 202, memory module 204, power module 206, user interface module 208 and communication interface module 210, which may be configured to interact with communication module 212. Further, authentication module 214 may be configured to interact with at least communication module 212 and user interface module 208. While communication module 212 and authentication module 214 are arranged separately from system module 200 in FIG. 2, it is merely for the sake of explanation herein. Some or all of the functionality associated with modules 212 and 214 may also be included in system module 200.

In device 100', processing module 202 may comprise one or more processors situated in separate components, or alternatively, may comprise one or more processing cores embodied in a single component (e.g., in a System-on-a-Chip (SOC) configuration) and any processor-related support circuitry (e.g., bridging interfaces, etc.). Example processors may include various x86-based microprocessors available from the Intel Corporation including those in the Pentium, Xeon, Itanium, Celeron, Atom, Core i-series product families. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in mobile device 104'. Some or all of the functionality commonly associated with the support circuitry may also be included in the same physical package as the processor (e.g., an SOC package like the Sandy Bridge integrated circuit available from the Intel Corporation). In one embodiment, processing module 202 may be equipped with virtualization technology (e.g., VT-x technology available in some processors and chipsets available from the Intel Corporation) allowing for the execution of multiple virtual machines (VM) on a single hardware platform. For example, VT-x technology may also incorporate trusted execution technology (TXT) configured to reinforce software-based protection with a hardware-enforced measured launch environment (MLE) such as previously described with respect to the loading of SUAM 112 from firmware in device 100.

Processing module 202 may be configured to execute instructions in device 100'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include memory configured to hold information during the operation of signage controller 106' such as, for example, static RAM (SRAM) or Dynamic RAM (DRAM). ROM may include memories such as bios memory configured to provide instructions when device 100' activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 206 may include internal power sources (e.g., a battery) and/or external power sources (e.g., electromechanical or solar generator, power grid, etc.), and related circuitry configured to supply device 100' with the power needed to operate.

User interface module 208 may include circuitry configured to allow users to interact with mobile 100' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.). Communication interface module 210 may be configured to handle packet routing and other control functions for communication module 212, which may include resources configured to support wired and/or wireless communications. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular, satellite, etc.). In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission.

Authentication module 214 may be configured to handle some or all of the operations disclosed in FIG. 1 with respect to LAM 106, OSLAM 108, FIM 110 and SUAM 112. In this pursuit, authentication module 214 may interact with communication module 212 and/or user interface module 208. An example configuration for authentication module 214 describing an example interaction is disclosed in FIG. 3 (e.g., as authentication module 214'). Authentication module 214' may comprise LAM 106, OSLAM 108 and SUAM 112 as previously disclosed. LAM 106 may interact with user interface module 208 to obtain login information (LI) (e.g., to prompt a user to enter login information and to obtain the login information entered by the user). The LI may then be provided to the OSLAM, which authenticate the LI, and if authenticated, may transmit a signed login success message (SLSM) to SUAM 112. SUAM 112 may then authenticate the SUAM, and if authenticated, may transmit an encrypted authentication message (EAM) back to OSLAM 108, which may then unlock device 100 (e.g., grant access to device 100).

Figure 3:
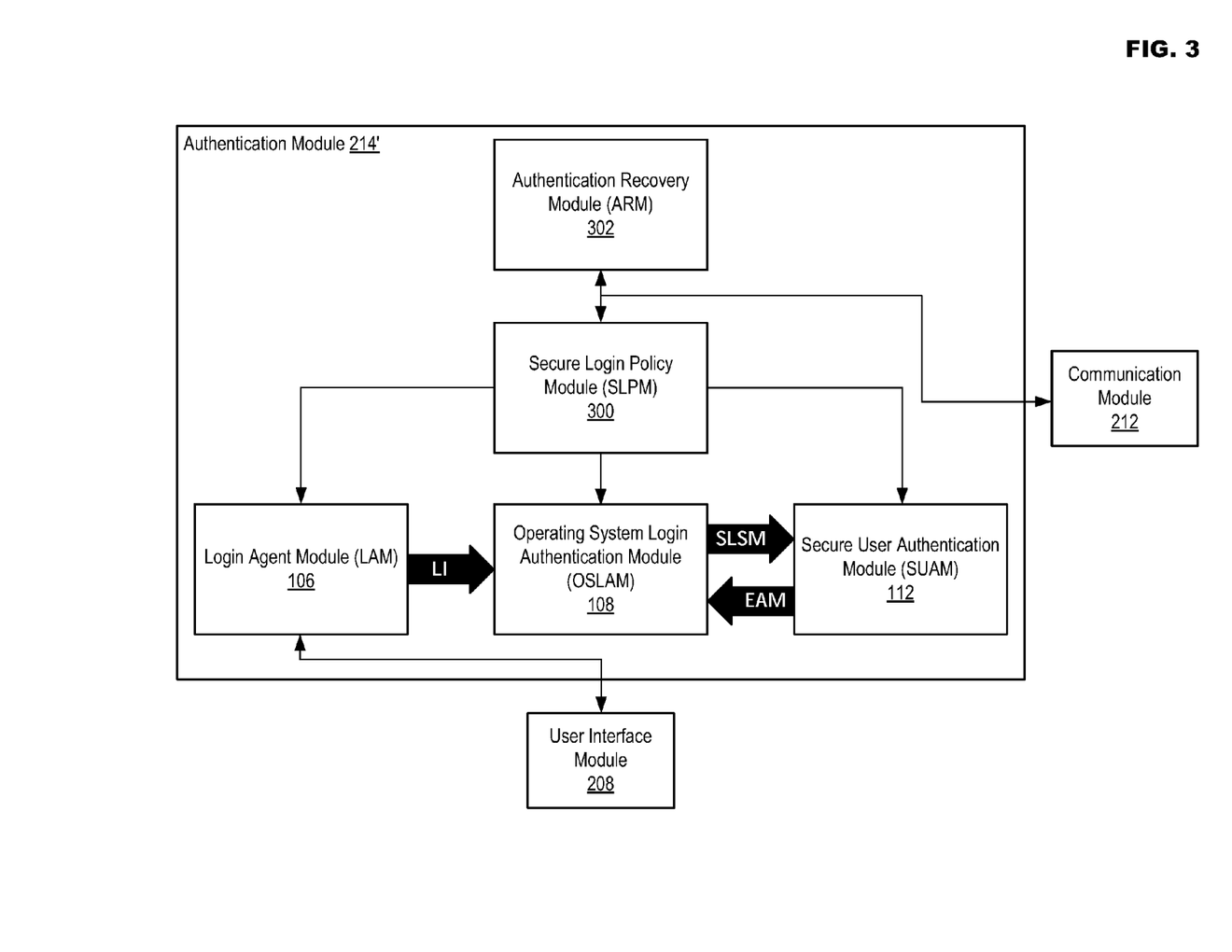
FIG. 3 illustrates an example configuration for an authentication module in accordance with at least one embodiment of the present disclosure.

In one embodiment, authentication module 214' may also include secure login policy module (SLPM) 300 and authentication recovery module (ARM) 302. SLPM 300 may be configured to control login ALM 106, OSLAM 108 and/or SUAM 112. For example, SLPM 300 may be configured to control LAM 106 and/or OSLAM 108 by establishing a login policy for one or both of these modules based on a context. Context, as referencing herein, may pertain to, for example, the status of device 100', the environment in which device 100' is operating, etc. For example, SLPM 300 may be configured to determine when device 100' is in a safe location (e.g., a known user's home, car, workplace, etc.). SLPM 300 may determine location by, for example, obtaining positioning information from communication module 212 (e.g., Global Positioning System (GPS) coordinates, identification of short-range networks sensed by device 100', etc.). In known locations, the login information required to access device 100' may be reduced (e.g., a password or a simple pattern-based touch screen interaction may be required). Alternatively, the positioning information may indicate that the device is in an unknown or public location (e.g., on public transportation, at an airport or train terminal, at a restaurant, etc.) In such instances the security policy may require more comprehensive login information (e.g., username and password, answers to identity challenge questions, biometrics such as fingerprint or retina scans, etc.). Context may also apply to the condition of device 100. For example, if device 100 was shut down and restarted (e.g., by normal shutdown or by removal of the battery), restarted after a security-related configuration was changed (e.g., after user identity information was changed or security software was disabled), etc. In this context more comprehensive login information may be required by the login policy to ensure that device 100' is compromised. The security policy may control the operation of LAM 106 by changing the prompt requesting login information based on the type and/or amount of login information required, and/or OSLAM 108 in the manner in which the login information is authenticated against known user information.

SLPM 300 may also be configured to control the operation of SUAM 112. For example, SLPM 300 may determine a wait time and/or may start a wait timer controlling the amount of time SUAM 112 will wait to receive an SLSM before shutting down device 100'. For example, SLPM 300 may set a two minute wait timer, and may start the wait timer after the prompt is first displayed to the user to login to device 100'. The manner in which SUAM 112 interacts with the wait timer may change based on the particular configuration of device 100'. For example, the wait time may be short, and may be reset every time the SUAM 112 receives the SLSM but does not authenticate the SLSM. Alternatively, the wait timer may be longer and may continue until an SLSM is both received and authenticated by SUAM 112. If not SLSM is received by SUAM 112, or if an SLSM is received but not authenticated, SUAM 112 may shut down device 100'. In one embodiment, SLPM 300 may also set a number of login attempts allowed in the device. The limit on the number of login attempts may provide an extra layer of security in that someone who is attempting a dictionary attack may be quickly limited in their ability to guess passwords, etc. The number of login attempts may be checked by SUAM 112 before shutting down device 100', and if the number of login attempts has been exceeded, SUAM 112 may place device 100' in a lockout state requiring user authentication recovery before device 100' can again be accessed.

In one embodiment, ARM 302 may be configured to provide user authentication recovery when security information is lost or forgotten, or alternatively, if device 100' has been placed in a lockout state. In performing user authentication recovery, ARM 302 may use communication module 212 to interact with a remote resource such as, for example, a computing device (e.g., a server) accessible via a network (e.g., the Internet). In one embodiment, the user authentication recovery may be orchestrated by the remote resource wherein user identity may be verified by, for example, username and password, challenge questions, biometric data, etc. Once the user's identity is verified, a security configuration in device 100' may be reset by the remote resource.

Figure 4:
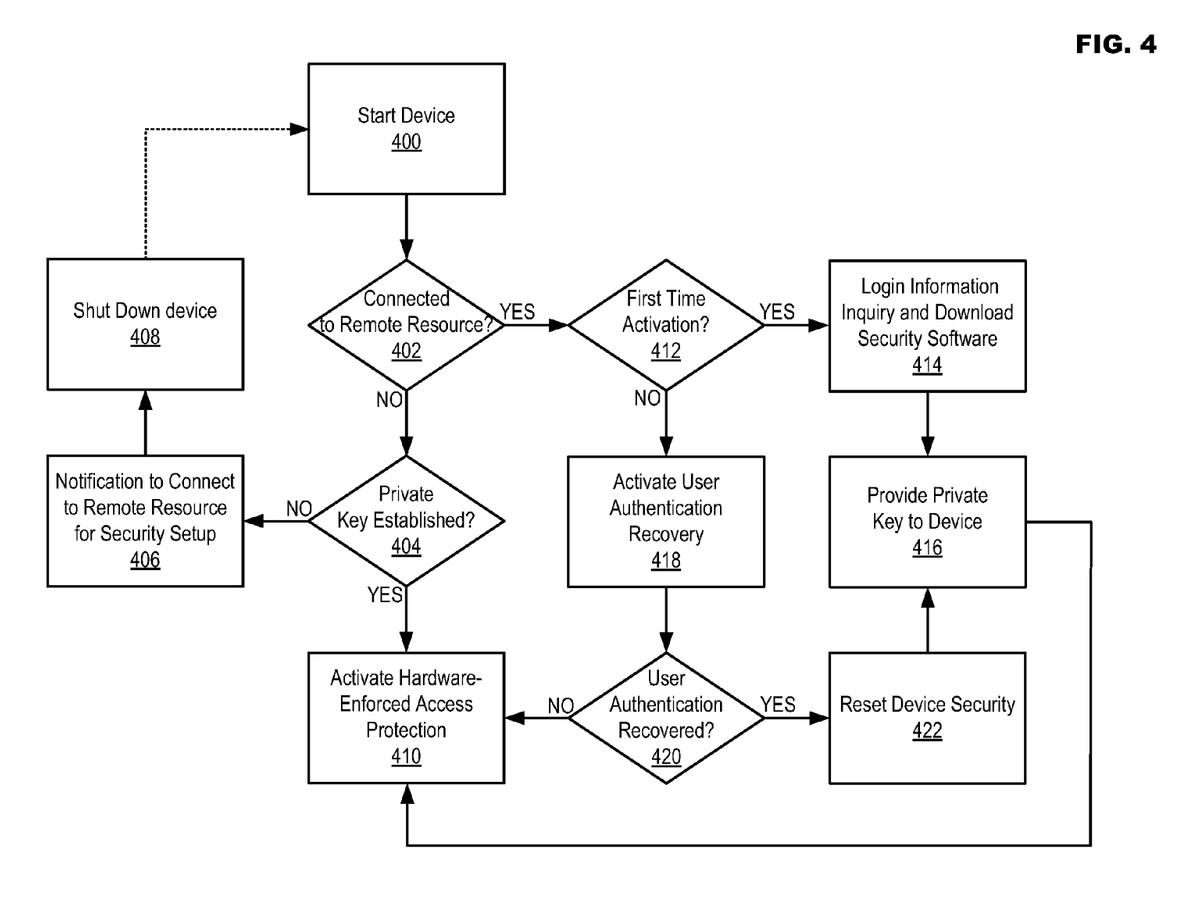
FIG. 4 illustrates a flowchart of example operations for activation and user authentication recovery in accordance with at least one embodiment of the present disclosure.

FIG. 4 illustrates a flowchart of example operations for activation and user authentication recovery in accordance with at least one embodiment of the present disclosure. At least one way in which security may be maintained in a device is by protecting access to security configuration from tampering. In one embodiment, software-based security and hardware-based security may exchange encrypted authentication messages. Further to placing the hardware-based security in firmware, the installation and configuration of the software-based security may be controlled by a secure remote resource. In this manner, traditional ways of circumventing device security may be thwarted. For example, a device secured in a manner consistent with the present disclosure may be obtained and bypass the software-based security features may be attempted by clearing the device memory and installing a new operating system. However, since the software-based security (e.g., some or all of LAM 106, OSLAM 108 and a private key used by OSLAM 108) may be installed by the remote resource, the new operating system will not provide messaging expected by the hardware-based security, and thus, the device will continue to power down and possibly enter a lockout ate until user authentication recovery is performed to reset the security.

In operation 400 a device may be started. Starting the device may generally include, for example, switching on, powering on, turning on, booting, etc. the device from a powered-down condition, rebooting or restarting the device from a powered-up condition, etc. Upon starting the device a determination may then be made in operation 402 as to whether the device is connected to a remote resource. For example, a determination may be made if the device is connected via a wired or wireless connection to the Internet, and further, whether contact can be made with a computing device (e.g., a server) using the wired or wireless connection. If in operation 402 a determination is made that the device is not connected to the remote resource, then in operation 404 a further determination may be made as to whether a private key has already been established in the device. There may be no private key in the device if, for example, the device has not been used (e.g., was recently purchased), if the OS has been overwritten (e.g., someone is trying to reuse the hardware), etc. If in operation 404 it is determined that no private key has been established in the device, then in operation 406 a notification may be presented by the device (e.g., may be displayed on the user interface of the device), the notification informing that the device must be connected to the remote resource to set up security in the device. The device may then shut down in operation 408 and may further optionally return to operation 400 if, for example, the device is again activated. Otherwise, if a determination is made that a private key exists, then in operation 410 hardware-enforced access protection may be activated in the device (e.g., an example of which is disclosed in FIG. 5).

If in operation 402 a determination is made that the device is connected to the remote resource, then in operation 412 a further determination may be made as to whether the device is being activated (e.g., requesting security to be set up) for the first time. The determination may be based on various factors including, for example, whether a private key has been established in the device, whether a serial number for the device has been recorded as registered in the remote resource, etc. If it is determined in operation 412 that the device is being activated for the first time, then in operation 414 a user information inquiry may be performed to obtain information about the owner of the device (e.g., for device owner registration, warranty and later use in user authentication recovery) and security software may be downloaded to the device from the remote resource. In one embodiment, the security software may include at least some or all of the LAM and the OSLAM. Then in operation 416 the private key may be provisioned to the device from the remote resource and hardware-enforced access protection may be activated in operation 410.

If in operation 412 it is determined that the device is not being activated for the first time, then in user authentication recovery may be activated in operation 418. For example, the device user may be asked to provide username and password information, may be required to respond to challenge questions based on information provided during first time activation, may be required to provide biometric information, etc. A determination may then be made in operation 420 as to whether user authentication was recovered (e.g., whether the user was identified as a known user for the device). If it is determined in operation 420 that the user authentication is not recovered, then in operation 410 hardware-enforced access protection may be started to protect the device from being compromised. If the user authentication is recovered, then in operation 422 security in the device may be reset (e.g., new passwords may be set and the existing private key may be deleted), and in operation 416 a new private key may be provisioned to the device by the remote resource. In operation 410 hardware-enforced access protection may be activated in the device.

Figure 5:
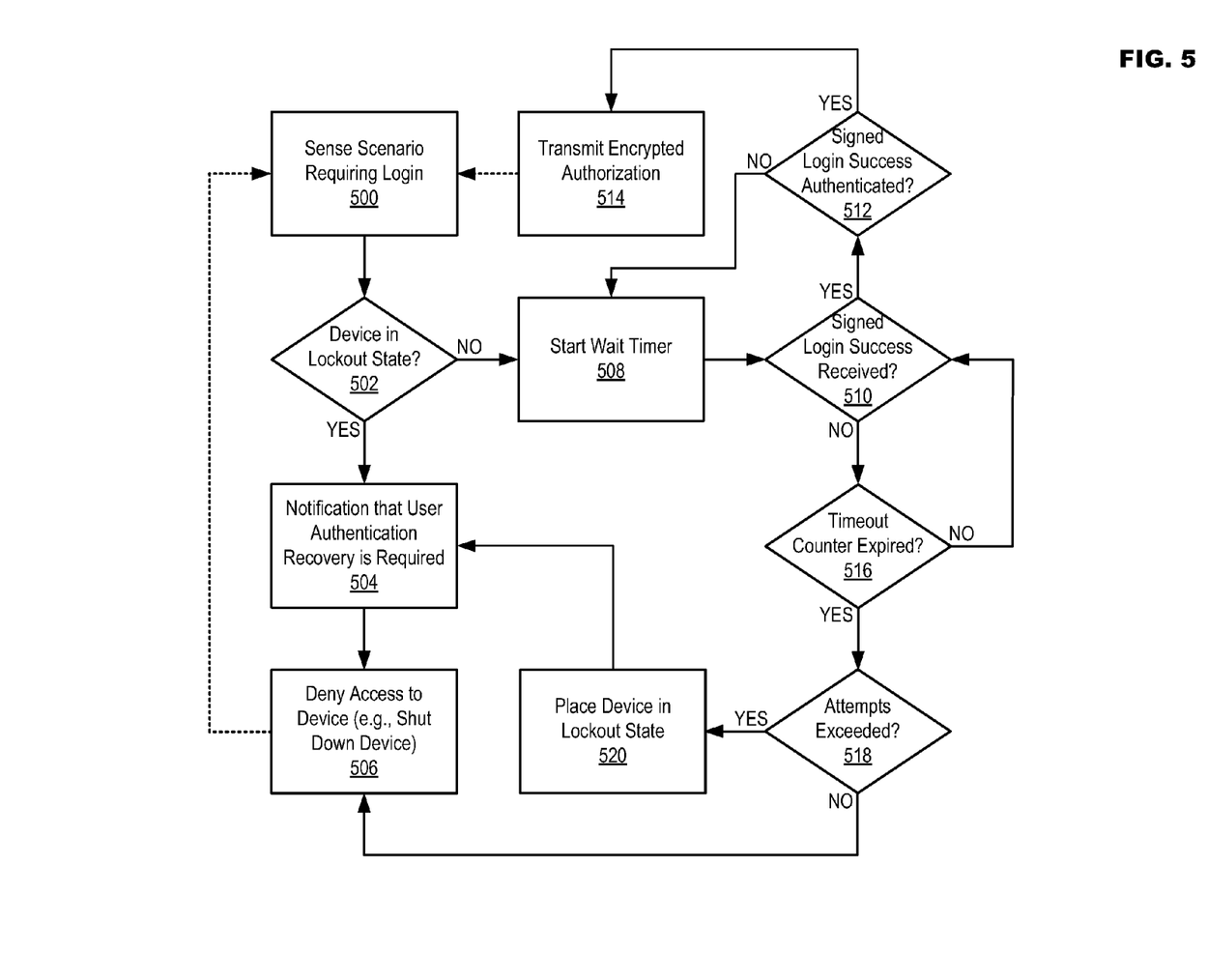
FIG. 5 illustrates a flowchart of example operations for hardware-enforced access protection in accordance with at least one embodiment of the present disclosure.

FIG. 5 illustrates a flowchart of example operations for hardware-enforced access protection in accordance with at least one embodiment of the present disclosure. The operations in FIG. 5 are from the perspective of a SUAM in a device. In operation 500 a scenario may be sensed requiring user to login into the device. For example, the device may have been powered down and reactivated, a security configuration may have changed in the device, a context of the device and/or environment may have changed and login may be dictated by the login policy, etc. A determination may then be made in operation 502 as to whether the device is in a lockout state. If it is determined in operation 502 that the device is in the lockout state, then in operation 504 a notification may be presented (e.g., may be displayed on a user interface in the device), the notification instructing that user authentication recovery must be performed before the device may again be accessed. Access may then be denied (e.g., the device may be shut down) and the device may optionally return to operation 500 wherein scenarios requiring login may be sensed.

If it is determined in operation 502 that the device is not in a lockout state, a wait timer may be started in operation 508. A determination may be made in operation 510 as to whether a SLSM is received. If in operation 508 it is determined that a SLSM has been received, then in operation 512 a further determination may be made as to whether the received SLSM can be authenticated. If in operation 512 it is determined that the SLSM has been authenticated, then in operation 514 an encrypted authentication message may be transmitted. The device may then optionally return to sensing for scenarios requiring login in operation 500. If the signed login success message cannot be authenticated in operation 512, the wait timer may be restarted in operation 508 and the SUAM may continue to wait for receipt of the SLSM in operations 510 and 516. If a determination is made in operation 516 that the wait timer has expired without receiving a SLSM, then a further determination may be made in operation 518 as to whether a certain number of login attempts has been met or exceeded in the device. If it is determined in operation 518 that the number of login attempts has been met or exceeded, then in operation 520 the device may be placed into a lockout state and notification of the lockout state may again be presented in operation 504. Otherwise, if it is determined in operation 518 that the number of login attempts has not been exceeded, then in operation 506 access may be denied (e.g., the device may be shut down) followed by an optional return to operation 500 to again sense login scenarios.

While FIGS. 4 and 5 illustrate various operations according to different embodiments, it is to be understood that not all of the operations depicted in FIGS. 4 and 5 are necessary for other embodiments. Indeed, it is fully contemplated herein that in other embodiments of the present disclosure, the operations depicted in FIGS. 4 and 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to systems and methods related to hardware-enforced access protection. An example device may comprise a login agent module (LAM), an operating system login authentication module (OSLAM) and a secure user authentication module (SUAM). The LAM may be configured to cause a prompt requesting login information to be presented by the device. The LAM may then provide the login information to the OSLAM, which may be configured to authenticate the login information using known user information. If authenticated, the OSLAM may generate and transmit a signed login success message to the SUAM using a private key. The SUAM may be secure/trusted software loaded by device firmware, and may be configured to authenticate the signed login success message. If authenticated, the SUAM may transmit an encrypted authentication message to the OSLAM. If the encrypted authentication message is authenticated, the OSLAM may grant access to the device.

The following examples pertain to further embodiments. In one example embodiment there is provided a device. The device may include a login agent module configured to cause a prompt to be presented by a user interface in the device, the prompt requesting login information to be entered into the device, a secure user authentication module configured transmit an encrypted authorization message based on receipt of a signed login success message, and an operating system login authentication module configured to receive the login information from the login agent module and to transmit the signed login success message to the secure user authentication module based on the login information.

The above example device may be further configured, wherein the secure user authentication module is further configured to transmit the encrypted authentication message to the operating system login authentication module based on authenticating the signed login success message. In this configuration the example device may be further configured, wherein the operating system login authentication module is further configured to grant access to the device based on receipt and authentication of the encrypted authentication message. In this configuration the example device may be further configured, wherein the secure user authentication module is further configured to be loaded into a trusted execution environment in the device by firmware in the device. In this configuration the example device may further comprise a firmware interface module configured to convey the signed login success message from the operating system login authentication module to the secure login authentication module and the encrypted authentication message from the secure login authentication module to the operating system login authentication module.

The above example device may be further configured, wherein the operating system login authentication module is further configured to authenticate the login information against known user information. In this configuration the example device may be further configured, wherein the operating system login authentication module is further configured to use the known user information to secure a private key, the private key being accessible when the login information is authenticated against the known user information. In this configuration the example device may be further configured, wherein the operating system login authentication module is further configured to generate the signed login success message using the private key. In this configuration the example device may be further configured, wherein the private key is encrypted by a trusted execution environment in the device.

The above example device may further comprise a secure policy login module configured to at least determine a context for the device and to set a login policy for at least one of the login agent or the operating system login authentication module based on the context. In this configuration the example device may be further configured, wherein the secure user authentication module is further configured to cause the device to shut down if a signed login success message is not received, and the secure policy login module is further configured to set an amount of time for the secure user authentication module to wait for receipt of the signed login success message before causing the device to shut down.

The above example device may further comprise an authentication recovery module configured to reconfigure user-related security in the device by communicating with a remote resource.

In another example embodiment there is provided a method. The method may include starting a device, determining if the device is connected to a remote resource, determining whether to perform a first time activation or a user authentication recovery based on determining that the device is connected to the remote resource, and determining whether a private key has been established in the device based on determining that the device is not connected to the remote resource.

The above example method may be further configured, wherein the remote resource is a computing device accessible via a network connection.

The above example method may further comprise providing security software and a private key to the device from the remote resource based on determining to perform a first time activation. In this configuration the example method may further comprise resetting device security and providing a private key to the device from the remote resource upon successful completion of user authentication recovery based on determining to perform user authentication recovery.

The above example method may further comprise issuing a notification to connect the device to the remote resource for security configuration based on determining that a private key has not been established in the device.

In another example embodiment there is provided a method. The method may include sensing that login to a device is required, determining if the device is in a lockout state, issuing a notification instructing that user authentication recovery is required and shutting down the device based on determining that the device is in a lockout state, and waiting for reception of a signed login success message based on determining that the device is not in a lockout state.

The above example method may further comprise transmitting an encrypted authorization message based on the reception and authentication of the signed login success message.

The above example method may further comprise starting a wait timer in the device, the wait timer establishing an amount of time to wait for reception of the signed login success message. In this configuration the example method may further comprise determining if a predetermined amount of login attempts have been exceeded based on the wait timer expiring without reception of the signed login message, and placing the device in a lockout state based on determining that the predetermined amount of login attempts has been exceeded.

In another example embodiment there is provided a system including at least a device, the system being arranged to perform any of the above example methods.

In another example embodiment there is provided a chipset arranged to perform any of the above example methods.

In another example embodiment there is provided at least one machine readable medium comprising a plurality of instructions that, in response to be being executed on a computing device, cause the computing device to carry out any of the above example methods.

In another example embodiment there is provided a device configured for hardware-enforced access protection, the device being arranged to perform any of the above example methods.

In another example embodiment there is provided a system comprising at least one machine-readable storage medium having stored thereon, individually or in combination, instructions that when executed by one or more processors result in the system performing any of the above example methods.

In another example embodiment there is provided a device. The device may include a login agent module configured to cause a prompt to be provided by a user interface in the device, the prompt requesting login information to be entered into the device, a secure user authentication module configured transmit an encrypted authorization message based on receipt of a signed login success message, and an operating system login authentication module configured to receive the login information from the login agent module and to transmit the signed login success message to the secure user authentication module based on the login information.

The above example device may be further configured, wherein the secure user authentication module is further configured to transmit the encrypted authentication message to the operating system login authentication module based on authenticating the signed login success message, the operating system login authentication module being further configured to grant access to the device based on receipt and authentication of the encrypted authentication message. In this configuration the example device may be further configured, wherein the secure user authentication module is further configured to be loaded into a trusted execution environment in the device by firmware, the device further comprising a firmware interface module configured to convey the signed login success message from the operating system login authentication module to the secure login authentication module and the encrypted authentication message from the secure login authentication module to the operating system login authentication module.

The above example device may be further configured, wherein the operating system login authentication module is further configured to authenticate the login information against known user information configured to secure a private key, and if the login information is authenticated against the known user information, to generate the signed login success message using the private key.

The above example device may be further comprise a secure policy login module configured to at least determine a context for the device, to set a login policy for at least one of the login agent or the operating system login authentication module based on the context and to set an amount of time for the secure user authentication module to wait for receipt of the signed login success message before the secure user authentication module causes the device to shut down.

In another example embodiment there is provided a method. The method may include starting a device, determining if the device is connected to a remote resource, determining whether to perform a first time activation or a user authentication recovery based on determining that the device is connected to the remote resource, and determining whether a private key has been established in the device based on determining that the device is not connected to the remote resource.

The above example method may further comprise providing security software and a private key to the device from the remote resource based on determining to perform a first time activation.

The above example method may further comprise resetting device security and providing a private key to the device from the remote resource upon successful completion of user authentication recovery based on determining to perform user authentication recovery.

The above example method may further comprise issuing a notification to connect the device to the remote resource for security configuration based on determining that a private key has not been established in the device.

In another example embodiment there is provided a method. The method may include sensing that login to a device is required, determining if the device is in a lockout state, issuing a notification instructing that user authentication recovery is required and shutting down the device based on determining that the device is in a lockout state, and waiting for reception of a signed login success message based on determining that the device is not in a lockout state.

The above example method may further comprise transmitting an encrypted authorization message based on the reception and authentication of the signed login success message.

The above example method may further comprise starting a wait timer in the device, the wait timer establishing an amount of time to wait for reception of the signed login success message. In this configuration the example method may further comprise determining if a predetermined amount of login attempts have been exceeded based on the wait timer expiring without reception of the signed login message, and placing the device in a lockout state based on determining that the predetermined amount of login attempts has been exceeded.

In another example embodiment there is provided a system including at least a device, the system being arranged to perform any of the above example methods.

In another example embodiment there is provided at least one machine readable medium comprising a plurality of instructions that, in response to be being executed on a computing device, cause the computing device to carry out any of the above example methods.

In one example embodiment there is provided a device. The device may include a login agent module configured to cause a prompt to be provided by a user interface in the device, the prompt requesting login information to be entered into the device, a secure user authentication module configured transmit an encrypted authorization message based on receipt of a signed login success message, and an operating system login authentication module configured to receive the login information from the login agent module and to transmit the signed login success message to the secure user authentication module based on the login information.

The above example device may be further configured, wherein the secure user authentication module is further configured to transmit the encrypted authentication message to the operating system login authentication module based on authenticating the signed login success message. In this configuration the example device may be further configured, wherein the operating system login authentication module is further configured to grant access to the device based on receipt and authentication of the encrypted authentication message. In this configuration the example device may be further configured, wherein the secure user authentication module is further configured to be loaded into a trusted execution environment in the device by firmware in the device. In this configuration the example device may further comprise a firmware interface module configured to convey the signed login success message from the operating system login authentication module to the secure login authentication module and the encrypted authentication message from the secure login authentication module to the operating system login authentication module.

The above example device may be further configured, wherein the operating system login authentication module is further configured to authenticate the login information against known user information. In this configuration the example device may be further configured, wherein the operating system login authentication module is further configured to use the known user information to secure a private key, the private key being accessible when the login information is authenticated against the known user information. In this configuration the example device may be further configured, wherein the operating system login authentication module is further configured to generate the signed login success message using the private key. In this configuration the example device may be further configured, wherein the private key is encrypted by a trusted execution environment in the device.

The above example device may further comprise a secure policy login module configured to at least determine a context for the device and to set a login policy for at least one of the login agent or the operating system login authentication module based on the context. In this configuration the example device may be further configured, wherein the secure user authentication module is further configured to cause the device to shut down if a signed login success message is not received, and the secure policy login module is further configured to set an amount of time for the secure user authentication module to wait for receipt of the signed login success message before causing the device to shut down.

The above example device may further comprise an authentication recovery module configured to reconfigure user-related security in the device by communicating with a remote resource.

In another example embodiment there is provided a method. The method may include starting a device, determining if the device is connected to a remote resource, determining whether to perform a first time activation or a user authentication recovery based on determining that the device is connected to the remote resource, and determining whether a private key has been established in the device based on determining that the device is not connected to the remote resource.

The above example method may be further configured, wherein the remote resource is a computing device accessible via a network connection.

The above example method may further comprise providing security software and a private key to the device from the remote resource based on determining to perform a first time activation. In this configuration the example method may further comprise resetting device security and providing a private key to the device from the remote resource upon successful completion of user authentication recovery based on determining to perform user authentication recovery.

The above example method may further comprise issuing a notification to connect the device to the remote resource for security configuration based on determining that a private key has not been established in the device.

In another example embodiment there is provided a method. The method may include sensing that login to a device is required, determining if the device is in a lockout state, issuing a notification instructing that user authentication recovery is required and shutting down the device based on determining that the device is in a lockout state, and waiting for reception of a signed login success message based on determining that the device is not in a lockout state.

The above example method may further comprise transmitting an encrypted authorization message based on the reception and authentication of the signed login success message.

The above example method may further comprise starting a wait timer in the device, the wait timer establishing an amount of time to wait for reception of the signed login success message. In this configuration the example method may further comprise determining if a predetermined amount of login attempts have been exceeded based on the wait timer expiring without reception of the signed login message, and placing the device in a lockout state based on determining that the predetermined amount of login attempts has been exceeded.

In another example embodiment there is provided a system. The system may include means for starting a device, means for determining if the device is connected to a remote resource, means for determining whether to perform a first time activation or a user authentication recovery based on determining that the device is connected to the remote resource, and means for determining whether a private key has been established in the device based on determining that the device is not connected to the remote resource.

The above example system may be further configured, wherein the remote resource is a computing device accessible via a network connection.

The above example system may further comprise means for providing security software and a private key to the device from the remote resource based on determining to perform a first time activation. In this configuration the example system may further comprise means for resetting device security and providing a private key to the device from the remote resource upon successful completion of user authentication recovery based on determining to perform user authentication recovery.

The above example system may further comprise means for issuing a notification to connect the device to the remote resource for security configuration based on determining that a private key has not been established in the device.

In another example embodiment there is provided a system. The system may include means for sensing that login to a device is required, means for determining if the device is in a lockout state, means for issuing a notification instructing that user authentication recovery is required and shutting down the device based on determining that the device is in a lockout state, and means for waiting for reception of a signed login success message based on determining that the device is not in a lockout state.

The above example system may further comprise means for transmitting an encrypted authorization message based on the reception and authentication of the signed login success message.

The above example system may further comprise means for starting a wait timer in the device, the wait timer establishing an amount of time to wait for reception of the signed login success message. In this configuration the example system may further comprise means for determining if a predetermined amount of login attempts have been exceeded based on the wait timer expiring without reception of the signed login message, and means for placing the device in a lockout state based on determining that the predetermined amount of login attempts has been exceeded.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
   a processor;
   a low privilege environment hosting a login agent module and an operating system login authentication module, the login agent module to cause a prompt to be presented by a user interface in the device, the prompt requesting login information to be entered into the device;
   a trusted execution environment hosting a secure user authentication module, the secure user authentication module to transmit an encrypted authorization message based on receipt of a signed login success message;
   a secure policy login module to at least determine a context for the device and to set a login policy for at least one of the login agent or the operating system login authentication module based on the context; and
   an authentication recovery module to reconfigure user-related security in the device by communicating with a remote resource;

wherein the operating system login authentication module is to receive the login information from the login agent module and to transmit the signed login success message to the secure user authentication module based on the login information.

2. The device of claim 1, wherein the secure user authentication module is further to transmit the encrypted authentication message to the operating system login authentication module based on authenticating the signed login success message.

3. The device of claim 2, wherein the operating system login authentication module is further to grant access to the device based on receipt and authentication of the encrypted authentication message.

4. The device of claim 2, wherein the trusted execution environment is further to load the secure user authentication module.

5. The device of claim 3, further comprising a firmware interface module to convey the signed login success message from the operating system login authentication module to the secure login authentication module and the encrypted authentication message from the secure login authentication module to the operating system login authentication module.

6. The device of claim 1, wherein the operating system login authentication module is further to authenticate the login information against known user information from within said trusted execution environment.

7. The device of claim 6, wherein the operating system login authentication module is further to use the known user information to secure a private key, the private key being accessible when the login information is authenticated against the known user information.

8. The device of claim 7, wherein the operating system login authentication module is further to generate the signed login success message using the private key.

9. The device of claim 7, wherein the private key is encrypted by said trusted execution environment.

10. The device of claim 1, wherein the secure user authentication module is further to cause the device to shut down if a signed login success message is not received, and the secure policy login module is further to set an amount of time for the secure user authentication module to wait for receipt of the signed login success message before causing the device to shut down.

* * * * *